(12) United States Patent
Schuller et al.

(10) Patent No.: US 10,220,855 B2
(45) Date of Patent: Mar. 5, 2019

(54) METHOD FOR DETERMINING A DRIVING RANGE OF A MOTOR VEHICLE, AND MOTOR VEHICLE

(71) Applicant: Audi AG, Ingolstadt (DE)

(72) Inventors: Florian Schuller, Ismaning (DE); Florian Haubner, Willanzheim (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/780,625

(22) PCT Filed: Nov. 9, 2016

(86) PCT No.: PCT/EP2016/077046
§ 371 (c)(1),
(2) Date: Jul. 27, 2018

(87) PCT Pub. No.: WO2017/092989
PCT Pub. Date: Jun. 8, 2017

(65) Prior Publication Data
US 2018/0354526 A1    Dec. 13, 2018

(30) Foreign Application Priority Data

Dec. 4, 2015   (DE) .......................... 10 2015 015 743

(51) Int. Cl.
*B60W 40/12*   (2012.01)
*G07C 5/02*    (2006.01)

(52) U.S. Cl.
CPC .............. *B60W 40/12* (2013.01); *G07C 5/02* (2013.01); *B60W 2510/305* (2013.01); *B60W 2550/12* (2013.01); *B60W 2550/40* (2013.01)

(58) Field of Classification Search
CPC .......... B60W 40/12; B60W 2510/305; B60W 2550/12; B60W 2550/40; G07C 5/02
(Continued)

(56) References Cited

U.S. PATENT DOCUMENTS 9,478,079 B2    10/2016 Lenhardt et al.
9,604,641 B2 *  3/2017 Al-Stouhi ....... B60W 30/18154
(Continued)

FOREIGN PATENT DOCUMENTS

DE    102009016869 A1    10/2010
DE    102009048821 A1    4/2011
(Continued)

OTHER PUBLICATIONS

International Search Report and Written Opinion of the International Searching Authority directed to related International Patent Application No. PCT/EP2016/077046, dated Mar. 28, 2017, with attached English-language translation; 25 pages.
(Continued)

*Primary Examiner* — Gertrude Arthur Jeanglaude
(74) *Attorney, Agent, or Firm* — Sterne, Kessler, Goldstein & Fox P.L.L.C.

(57) ABSTRACT

A method is disclosed for determining a driving range for a motor vehicle. Initially, extra-vehicle data are received, whereby the extra-vehicle data include at least one weather parameter value. A vehicle-dependent parameter value, which depends on the extra-vehicle data, is determined. The driving range for the motor vehicle, which depends on the vehicle-dependent parameter value, is determined. Also disclosed is a motor vehicle that is configured to receive extra-vehicle data, including at least one weather parameter value. The motor vehicle is configured to determine a vehicle-dependent parameter value from the extra-vehicle data. The motor vehicle is configured to determine a driving range from the vehicle-dependent parameter value. In the method and motor vehicle embodiments, the extra-vehicle data are obtained from at least one additional motor vehicle.

19 Claims, 1 Drawing Sheet

(58) Field of Classification Search
USPC .......................................................... 701/123
See application file for complete search history.

(56) References Cited

U.S. PATENT DOCUMENTS

| | | |
|---|---|---|
| 2010/0138142 A1 | 6/2010 | Pease |
| 2012/0158229 A1 | 6/2012 | Schaefer |
| 2014/0214267 A1 | 7/2014 | Sellschopp |
| 2015/0161830 A1 | 6/2015 | Lenhardt et al. |

FOREIGN PATENT DOCUMENTS

| | | |
|---|---|---|
| DE | 102011108385 B3 | 6/2012 |
| DE | 102011116115 A1 | 4/2013 |
| DE | 102013225563 A1 | 6/2015 |
| DE | 102015202837 A1 | 8/2015 |
| DE | 102014204308 A1 | 9/2015 |
| GB | 2524393 A | 9/2015 |

OTHER PUBLICATIONS

International Preliminary Report on Patentability directed to related International Patent Application No. PCT/EP2016/077046, dated Jun. 5, 2018, with attached English-language translation; 20 pages.
English-language abstract of German Patent Application Publication No. DE 102009048821 A1, published Apr. 14, 2011; 1 page.
English-language abstract of German Patent Application Publication No. DE 102011108385 B3, published Jun. 28, 2012; 5 pages.
English-language abstract of German Patent Application Publication No. DE 102011116115 A1, published Apr. 18, 2013; 1 page.
English-language abstract of German Patent Application Publication No. DE 102014204308 A1, published Sep. 10, 2015; 5 pages.

* cited by examiner

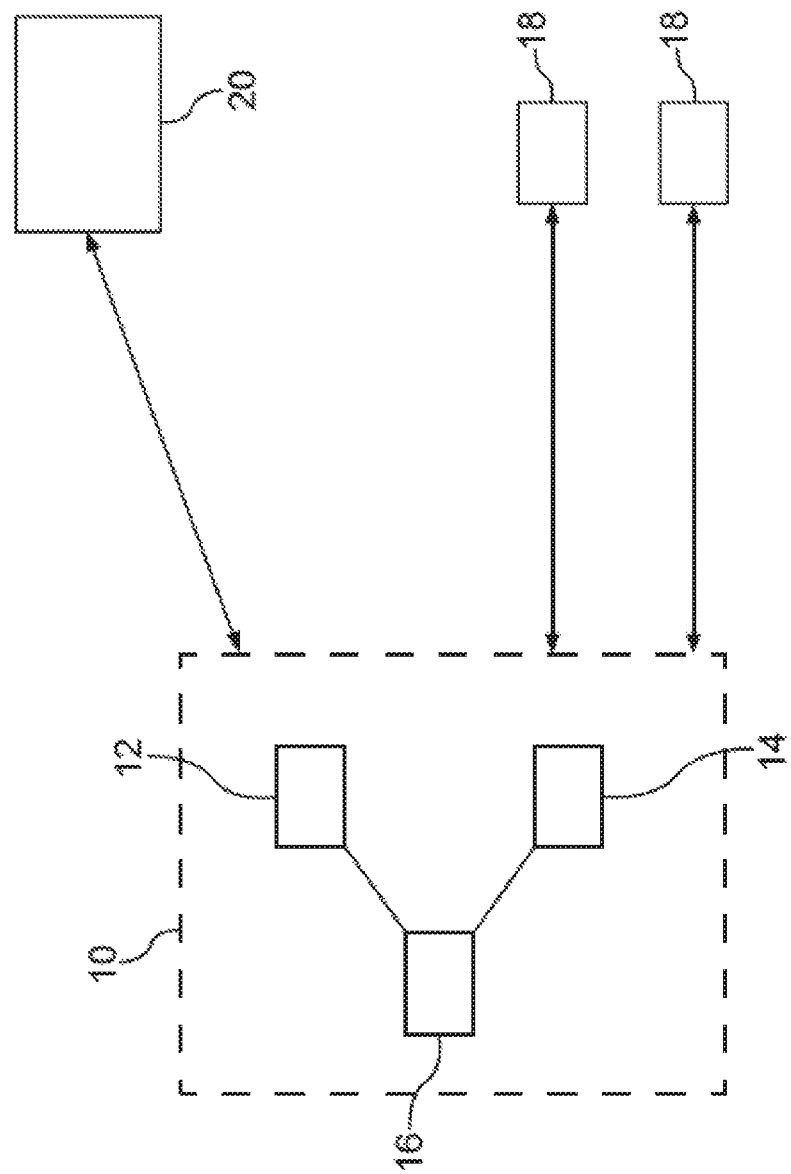

METHOD FOR DETERMINING A DRIVING RANGE OF A MOTOR VEHICLE, AND MOTOR VEHICLE

TECHNICAL FIELD

This disclosure relates to a method for determining a driving range for a motor vehicle. This disclosure also relates to a motor vehicle.

BACKGROUND

Maximum availability of a driving range for a motor vehicle depends upon, among other things, the environmental conditions around the motor vehicle. The driving range for a motor vehicle is intended in particular to depend on a remaining amount of energy, such as an amount of fuel in a motor vehicle having a combustion engine, or such as the energy stored in a battery of an electric vehicle. Because the environmental conditions, which depend on the position of the motor vehicle and/or on the weather, can be constantly changing, the previously determined driving range can change accordingly.

To adjust the driving range for the motor vehicle, which depends on the environmental conditions around the motor vehicle, it is known to determine the ambient temperature around the motor vehicle by means of in-vehicle temperature sensors. A change in the power demand for the vehicle, which depends on the change in temperature, can be deduced. The disadvantage of this method is that, especially at the beginning of a trip in a motor vehicle, the temperature sensors are correcting a sensed value at specific intervals in time until the value approaches a constant value. As a result, the actual driving range can only be determined following a certain duration after the beginning of the trip. Thus, there is a delay in time.

To determine the driving range for a motor vehicle in a reliable manner, DE 10 2009 048 821 A1 proposes a method for establishing the range for a motor vehicle having an energy storage device used for supplying motive power. In this case, the method takes two different parameters into account. One of the two parameters characterizes a status parameter for the energy storage device. The other parameter is obtained from information relating to weather and other factors.

Described in DE 10 2009 016 869 A1 is a method for operating a vehicle that comprises an electrical drive means and at least one rechargeable and exchangeable electrical energy unit. In this method, a range for the vehicle is calculated on the basis of the state of charge of the electrical energy unit. The method further provides a weather information device for receiving and evaluating weather information as well as a weather data sensing device for sensing weather data. It is, in this way, possible to refer to the weather data to calculate the range.

A method for determining a driving range for a motor vehicle is evident from DE 10 2011 108 385 B3, in which the driving range is determined on the basis of vehicle-dependent and vehicle-independent parameter values. The vehicle-dependent and vehicle-independent parameter values are recorded by the motor vehicle and transmitted to a server.

A method for estimating the range for a vehicle having an electrical drive is evident from DE 10 2014 204 308 A1. The method bases the range estimate on an energy consumption model for the vehicle, the remaining amount of energy available in the vehicle's energy storage device, and a road database. The range estimate takes into account an expected route of travel for the vehicle and location-specific environmental data along the expected route of travel.

A method for monitoring at least one sensor of a vehicle is described in DE 10 2013 225 563 A1. The method compares values measured by the sensors with values measured by at least one comparison vehicle.

A method for determining a range for a vehicle comprising an electric motor as a drive means is evident from DE 10 2011 116 115 A1. The method initially determines or specifies a route of travel for the vehicle. A further method step determines the recuperation events taking place along the route of travel. Finally, the range is determined as a function of the route of travel, the recuperation events, and the environmental conditions along the route of travel.

The disadvantage of a method of this kind is that the data, which are obtained from a server device, are only recorded by the server device on a regional level and contain no location-specific information.

BRIEF DESCRIPTION OF THE DRAWINGS/FIGURES

The accompanying drawing, which is incorporated herein and forms part of the specification, illustrates the present embodiments and, together with the description, further serves to explain the principles of the present embodiments and to enable a person skilled in the relevant art(s) to make and use the present embodiments.

FIG. 1 illustrates a schematic block diagram of the components and communication paths involved in performing a method for determining a driving range for a motor vehicle, according to some embodiments.

The features and advantages of the present embodiments will become more apparent from the detailed description set forth below when taken in conjunction with the drawing, in which like reference characters identify corresponding elements throughout. In the drawing, like reference numbers generally indicate identical, functionally similar, and/or structurally similar elements.

DETAILED DESCRIPTION

The object of the this disclosure is to provide a method that determines a driving range for a motor vehicle in a particularly reliable manner.

This problem is to be solved by the subject matter of the independent claims. Preferential embodiments follow from the features of the dependent claims.

This disclosure is based upon the finding that the prior art, in which data are obtained from a server, is in need of improvement.

Accordingly, a first aspect of this disclosure provides a method for determining a driving range for a motor vehicle. In the method, extra-vehicle data are received. The extra-vehicle data in this case comprise at least one weather parameter value. Furthermore, one vehicle-dependent parameter value can be determined that depends upon the extra-vehicle data. The driving range for the motor vehicle, which depends on the vehicle-dependent parameter value, can be determined. The method is distinguished by the fact that extra-vehicle data can be obtained, or received, from at least one of multiple additional motor vehicles.

According to some embodiments, the extra-vehicle data received can be verified by means of a confidence estimation before the vehicle-dependent parameter value is determined. A confidence estimation preferably can be understood to mean a probability calculation that takes a confidence interval into account. A confidence interval is an interval known from the field of statistics that specifies the precision for the interval in which a parameter has been estimated to be found. A confidence estimation can be performed on the extra-vehicle data from the multiple additional motor vehicles. The confidence estimation can take into account a travel time for the additional motor vehicle among the multiple additional motor vehicles and/or for a minimum number of multiple additional motor vehicles. If the multiple additional motor vehicles drive for a sufficient duration, meaning for a predetermined period of time, and a minimum number of vehicles are available, then the extra-vehicle data can be evaluated as being sufficiently reliable by means of the confidence estimation. It can also be determined by means of the confidence estimation whether the extra-vehicle data recorded lie within the confidence interval. In other words, the extra-vehicle data can be selected by means of the confidence estimation.

Specifically, if the data used for determining the driving range are obtained, or received, from a server device, then the data obtained are often imprecise because the server device sensing area typically relates to a larger region, and the sensing device is, as a result, unable to provide any location-specific information.

Obtaining the data from an additional motor vehicle can have the advantage of the additional motor vehicle being able to transmit location-specific data, namely for the more immediate area where the motor vehicle is currently located. As a result, the driving range can be reliably determined at any time and for every location where the motor vehicle is being put into operation.

Obtaining data from at least one additional motor vehicle can have the further advantage of the additional motor vehicle having already been driving for some time and the sensors it uses to sense the actual ambient temperature having already been adjusted. As a result, the driving range for the motor vehicle can already be determined at the beginning of a trip without the motor vehicle having to rely on its own sensor system.

For example, the extra-vehicle data for the motor vehicle can be transmitted by the additional motor vehicle using car-to-car communication. Car-to-car communication refers to the exchange of information and/or data, in this case extra-vehicle data, between the additional motor vehicle and the motor vehicle. Car-to-car communication takes place using, for example, a WLAN standard or a Wi-Fi standard. The motor vehicle is able to receive the extra-vehicle data from the at least one additional motor vehicle within a vicinity of the motor vehicle, in particular within a radius of between 5 m and 20 km. Extra-vehicle in this context means that data of this kind relate to a value for a vicinity of the motor vehicle. The extra-vehicle data are referenced to determine a vehicle-dependent parameter value. Vehicle-dependent in this context means, in particular, that a parameter value of this kind relates to a value from the vehicle.

One embodiment provides that an energy demand per route segment and/or per unit of time, for cooling and/or climate control in particular, can be determined as a parameter value for the motor vehicle. The energy demand for the motor vehicle per route segment and/or per unit of time can be deduced on the basis of the extra-vehicle data received. The energy demand for cooling includes, for example, the power required to cool an engine and/or additional motor vehicle components while operating the motor vehicle. The energy demand for climate control includes, for example, the power required to operate a motor vehicle climate control system used to condition the air of a motor vehicle passenger compartment during operation of the motor vehicle. In other words, the power required for the thermal management of the motor vehicle can be determined as a function of the vehicle-dependent parameter value. The resulting advantage is the ability to improve the range prediction for the motor vehicle.

Advantageously, the weather parameter value can characterize an ambient temperature. The term weather parameter value is understood in particular to mean a value that describes the condition of the atmosphere in a vicinity of the motor vehicle. The term ambient temperature means, in particular, a temperature in a vicinity of the motor vehicle. The term vicinity preferably means a space or area surrounding the motor vehicle. The weather parameter value can preferably also include a wind speed and/or an atmospheric humidity in the vicinity of the motor vehicle. For example, a sensor of the additional motor vehicle can sense an ambient temperature and transmit it via car-to-car communication to the motor vehicle. Because the weather parameter value relates to a direct vicinity of the motor vehicle, a driving range can be determined in a particularly simple and reliable manner.

Advantageously, the extra-vehicle data can include at least one energy demand for the additional motor vehicle per unit of distance and/or per unit of time. For example, the energy demand can include a thermal management power prediction for the additional motor vehicle. The term thermal management power prediction means, in particular, an energy demand for the cooling and/or climate control of the additional motor vehicle.

Nearly the same environmental conditions, such as the ambient temperature of the motor vehicle, can exist for the additional motor vehicle, which is preferably located in the same vicinity as the motor vehicle. For example, the additional motor vehicle can deduce its energy demand from environmental conditions that can be sensed by means of an in-vehicle sensor system in the additional motor vehicle. The additional motor vehicle can preferably also feature a temperature sensor for sensing an ambient temperature. The additional motor vehicle can further feature a device that is configured to determine an energy demand per unit of time and/or per route segment, which depends on the temperature sensed, and transmit this energy demand value to the motor vehicle.

The advantage thereby is that the driving range can be determined not only on the basis of the weather parameter value in a vicinity of the motor vehicle, but rather also in a specific manner via an energy demand value from at least one additional motor vehicle. The advantage thereby is that a driving range can be determined in a particularly simple and reliable manner.

Advantageously, the extra-vehicle data can further be obtained, or received, from a server device. The server device can, for example, relate to a server device of a measuring station, in particular a weather station. For example, the weather station can sense and provide current and/or future weather data. Current and future weather data can also be provided via a server device on the Internet. The data from the server device are preferably updated continuously, meaning at regular time intervals. Moreover, the data from a server device can also be taken into account in addition to the data obtained from at least one additional motor vehicle. As a result, the precision of the data can be enhanced, thus enhancing the reliability of the driving range determination.

A further embodiment provides that, following determination of the driving range for the vehicle, which depends on the vehicle-dependent parameter value, a current weather parameter value corresponding to the weather parameter value in a vicinity of the motor vehicle can be sensed. A difference can be determined between the current weather parameter value and the weather parameter value, and the weather parameter value can be adapted to the current weather parameter value if the difference exceeds a predetermined threshold. The term difference means, in particular, the value resulting from subtracting the weather parameter value from the current weather parameter value. If the difference determined is greater than a predetermined difference, hence a threshold, then the weather parameter value preferably can be aligned with the current weather parameter value. Thus, the current weather parameter value preferably can be used or referenced in calibrating the weather parameter value.

Advantageously, the current weather parameter value, for example, a temperature, can be sensed by means of a sensing device of the motor vehicle. The sensing device can, for example, be a temperature sensor. As a result, a weather parameter value can be sensed in a direct vicinity of the motor vehicle. For example, the temperature measured using the temperature sensor can be used to make a long-term, fine correction to the weather parameter value and thus to the driving range. For example, the extent to which the current weather parameter value sensed by the sensing device of the motor vehicle approaches the current weather parameter value sensed for the extra-vehicle data can be observed for this purpose.

Some embodiments relate to a motor vehicle. The motor vehicle is preferably designed as an electric vehicle. The motor vehicle can feature a receiving device for receiving extra-vehicle data, whereby the extra-vehicle data can include at least one weather parameter value. The motor vehicle can further feature an evaluation device, which can be configured to determine a vehicle-dependent parameter value, which can depend on the extra-vehicle data. The evaluation device can be further configured to determine a driving range for the motor vehicle, which can depend on the vehicle-dependent parameter value. The extra-vehicle data can be, in this case, provided by at least one additional motor vehicle. The evaluation device can be further configured, before the vehicle-dependent parameter value is determined, to verify the extra-vehicle data received by means of a confidence estimation. The confidence estimation can take into account a travel time for the additional motor vehicle among the multiple additional motor vehicles and/or for a minimum number of additional motor vehicles.

The advantages and embodiments previously described in connection with the disclosed method can also be applied to the motor vehicle.

Some embodiments are further based on the knowledge that the temperature sensors in motor vehicles that rely on in-vehicle temperature sensors for determining driving range are installed in the motor vehicle to be protected from direct interaction with the environment of the motor vehicle. As a result, the values sensed by these temperature sensors can deviate with respect to the actual ambient temperature, given rapid changes in the ambient temperature. As a further result, a temperature can only be sensed with the necessary precision after a predetermined period, for example, after two minutes.

Accordingly, a second aspect of this disclosure provides a further method for determining a driving range for a motor vehicle. In the method, at least one weather parameter value can be received. A vehicle-dependent parameter value can be determined that depends on the at least one received weather parameter value. The driving range for the motor vehicle, which can depend on the vehicle-dependent parameter value, can be determined. This method is distinguished by the fact that a current weather parameter value in a vicinity of the motor vehicle corresponding to the received weather parameter value can be sensed, and a difference determined between the current weather parameter value and the received weather parameter value. Finally, the received weather parameter value can be adapted to the current weather parameter value if the difference exceeds a predetermined threshold, which can verify the extent to which the corresponding current weather parameter value approaches the received weather parameter value.

One embodiment of the invention is described in the following paragraphs. FIG. 1 shows a schematic block diagram of the components and communication paths involved in performing the method disclosed herein.

The embodiment explained in the following paragraphs relates to a preferential embodiment of this disclosure. The components of the embodiment described represent features that are to be regarded as individual and independent from each other, where each feature can refine this disclosure as an individual element or can be used in combinations other than that shown. Moreover, the embodiment described is also able to be augmented by the previously described features of this disclosure.

FIG. 1 shows a motor vehicle 10. The motor vehicle 10 can relate to a motor vehicle, in particular a passenger motor vehicle. The motor vehicle 10 can include a receiving device 12, a sensing device 14, and an evaluation device 16. The receiving device 12 and the sensing device 14 can both be coupled with the evaluation device 16. In this case, the term coupled means, in particular, that the receiving device 12 and the sensing device 14 are connected by means of electrical signals via a data connection to the evaluation device 16.

The sensing device 14 can be configured to collect data and transmit it to the evaluation device 16. The sensing device 14 can, for example, relate to a sensor that is configured to sense a current weather parameter value in a vicinity of the motor vehicle 10. The current weather parameter value can, for example, relate to a temperature and/or an atmospheric humidity and/or a wind speed in the vicinity of the motor vehicle 10. For example, the sensor can be designed as a temperature sensor and sense a temperature in the vicinity of the motor vehicle 10.

The receiving device 12 can be configured to receive data and transmit it to the evaluation device 16. The receiving device 12 is able to query extra-vehicle data from at least one additional motor vehicle 18 and/or a server device 20. As can be gathered from FIG. 1, the extra-vehicle data can also be transmitted by multiple additional motor vehicles 18, meaning that each additional motor vehicle 18 can provide extra-vehicle data for itself. The extra-vehicle data can comprise, for example, a weather parameter value, for example, a temperature in a vicinity of the motor vehicle 10, and/or the additional motor vehicle 18 or rather the additional motor vehicles 18.

The server device 20 can, for example, relate to a server device of a measuring station, in particular a weather station. For example, the weather station can sense and provide current and/or future weather information. The receiving device 12 of the motor vehicle 10 can, for example, transmit an actual position of the motor vehicle 10 to the server device 20. The server device 20 can, based on the current position or the location of the motor vehicle 10, transmit a location-specific temperature value as the weather parameter value.

The transfer of extra-vehicle data between the server device 20 and the receiving device 12 can take place, for example, using a known mobile communications standard used for data transfer. The transfer of data between the receiving device 12 of the motor vehicle 10 and the additional motor vehicle 18 can take place, for example, using a WLAN standard or a WiFi standard.

For the additional motor vehicle 18 to be able to provide extra-vehicle data, for example, a weather parameter value, the additional motor vehicle 18 can feature an additional sensing device (not shown in FIG. 1) for sensing a weather parameter value and/or for receiving the weather parameter value from the server device 20 and transmitting it to the motor vehicle 10. Like the sensing device 14 of the motor vehicle 10, the additional sensing device can also be designed as a sensor, in particular as a temperature sensor. The additional motor vehicle 18, which is communicating with the motor vehicle 10, can thus sense a temperature, for example, by means of the temperature sensor, and can transmit it to the motor vehicle 10, which can receive the temperature value via the receiving device 12 and can relay it to the evaluation device 16.

The evaluation device 16 can, for example, relate to a control apparatus which can be further coupled via suitable bus systems to suitable storage units and/or communication devices and/or navigation systems or the like.

The evaluation device 16 can be configured to determine a vehicle-dependent parameter value, which can depend on the extra-vehicle data. The evaluation device 16 can be further configured to determine a driving range for the motor vehicle 10, which can depend on the vehicle-dependent parameter value. If extra-vehicle data are obtained from multiple additional motor vehicles 18, then the evaluation device 16 can first perform a confidence estimation before determining the vehicle-dependent parameter value.

For example, if the extra-vehicle data relate to the temperature value that was provided by the additional motor vehicle 18, then the evaluation device 16 can, on the basis of this temperature value, calculate the energy demand per unit of time, for example, for controlling the climate of the passenger compartment. Based on the energy demand calculated, the evaluation device 16 can then calculate or estimate a driving range for the motor vehicle 10.

The driving range determined can, for example, be transmitted from the evaluation device 16 to a navigation apparatus (not shown in FIG. 1) of the motor vehicle 10 and be displayed on a display device of a navigation apparatus used by a driver of the motor vehicle 10.

The following will address the confidence estimation in greater detail.

As an example, temperature values can be sensed by the multiple additional motor vehicles 18 as extra-vehicle data, which undergo a confidence estimation. For this purpose, the evaluation device 16 can, for example, determine a temperature interval as the confidence interval within which the current ambient temperature falls. In this case, the temperature values falling within this temperature interval are then taken into account by the evaluation device 16. If, for example, an ambient temperature measures 25° C., then the temperature interval can have an interval range from 20° C. to 30° C. If, for example, one of the additional motor vehicles 18 then transmits a temperature value of 26° C., then this value will be taken into account by the evaluation device 16 to determine the vehicle-dependent parameter value. If a temperature value of 15° C. is transmitted by another of the additional motor vehicles 18, then this temperature value will preferably be discarded by the evaluation device 16 and no longer be taken into account. The ambient temperature used for establishing a temperature interval can preferably be obtained from the server device 20.

Instead of establishing a temperature interval for the confidence estimation, the individual extra-vehicle data obtained from the additional motor vehicles 18 can also be weighted. For example, the extra-vehicle data can be obtained from a previous travel period for the particular additional motor vehicle 18. For example, the longer the additional motor vehicle 18 has been operating, the more precise the data sensed by the additional sensing device of the additional motor vehicle 18 will be.

Furthermore, the evaluation device 16 can generate an average value from the data obtained from the additional motor vehicle 18 and can use it to determine the vehicle-dependent parameter value.

On the whole, an improvement in range prediction by a method for optimizing the thermal management power estimate with the aid of external temperature information and power demand information thus results from Internet data and/or swarm data obtained from multiple additional motor vehicles.

The maximum available range for electric vehicles is highly dependent on environmental conditions and is thus able to change abruptly.

For example, if an electric vehicle is sitting in a cool garage during the summer when the outside temperature is 30° C., then the vehicle will assume a long range. As soon as the car drives out of the garage, the actual energy needed for the prolonged cooling of the motor vehicle becomes evident, and the prediction for a long range decreases abruptly. In such situations, the customer should receive information to explain the abrupt change in range as being the result of environmental conditions.

Currently in the art, information regarding whether the environmental conditions have abruptly changed is determined by observing the temperature change and the power demand gradient. If both the temperature change and the power demand gradient are sufficiently high, then a change in environmental conditions will be assumed. In this context, both parameters must be observed over a sufficient period of time because the temperature sensor is installed so as to be protected from direct interaction with the environment, thus reducing the rate of change. A disadvantage of the current method is its low reliability due to temperature changes also occurring in other contexts. The algorithm currently being employed can only be reliably used during winter at cool temperatures; too many erroneous detections are caused during the summer. A further disadvantage lies in observing the data over a longer period of time (on the order of about 2 minutes). As a result, the customer receives the information after a delay of approximately this duration, so the relevance of the temperature changes does not necessarily exist for the customer.

The new method mainly uses current and future weather information, which is available online (for example, using Connect services) and can come from reliable measuring stations, as an initial estimate used for range prediction. Both temperature data and estimates for the thermal management power demand can likewise come from other vehicles via car-to-car communication. In addition, the in-vehicle sensors can be used for fine adjustment of the estimate.

The actual outside temperature from the internet or via car-to-car communication can be used as a baseline for estimating the range. In addition, thermal management power predictions for other vehicles received via car-to-car communication can be used if these vehicles have been driving for a sufficient duration. The information predicted by way of external information from the additional motor vehicles can already be validated or corrected by the in-vehicle sensor systems of the additional motor vehicles so that the information can also be sufficiently reliable. A minimum number of vehicles may be necessary for this purpose.

The temperature measured with the in-vehicle sensor can then be used to make a long-term, fine correction to the range prediction. For this purpose, it can be observed to what extent the temperature measured by the vehicle, and therefore the thermal management power demand, approaches the value previously predicted using external information. If large deviations continuously occur, then the estimate using external information may need to be corrected.

Should internet services not be available for certain periods of time, or should no other vehicles be available for communication, then the range prediction can be made using vehicle sensor data alone as a fallback solution.

The invention claimed is:

1. A method for determining a driving range for a motor vehicle, comprising:
   receiving extra-vehicle data, wherein the extra-vehicle data comprise at least one weather parameter value;
   determining a vehicle-dependent parameter value, which depends on the extra-vehicle data; and
   determining the driving range for the motor vehicle, which depends on the vehicle-dependent parameter value, wherein the method further comprises:
      receiving the extra-vehicle data from multiple additional motor vehicles, and wherein the determining the driving range further comprises:
         verifying the received extra-vehicle data using a confidence estimation, before the vehicle-dependent parameter value is determined, wherein the confidence estimation is based on a travel time for one of the multiple additional motor vehicles or for a minimum number of the multiple additional motor vehicles.

2. The method of claim 1, further comprising:
   determining an energy demand per route segment or per unit of time as the vehicle-dependent parameter value for the motor vehicle.

3. The method of claim 2, wherein the energy demand per route segment or per unit of time is used for cooling or climate control of the motor vehicle.

4. The method of claim 1, wherein the at least one weather parameter value comprises an ambient temperature.

5. The method of claim 1, wherein the extra-vehicle data comprises at least one energy demand per unit of distance or per unit of time for the one of the multiple additional motor vehicles.

6. The method of claim 1, further comprising:
   receiving the extra-vehicle data from a server device.

7. The method of claim 1, further comprising:
   after the determining of the driving range for the motor vehicle, sensing a current weather parameter value corresponding to one of the at least one weather parameter value in a vicinity of the motor vehicle, comprising:
      determining a difference between the current weather parameter value and the one of the at least one weather parameter value;
      comparing the difference to a predetermined threshold; and
      adapting the one of the at least one weather parameter value to the current weather parameter value if the difference exceeds the predetermined threshold.

8. The method of claim 7, wherein the sensing of the current weather parameter value is performed using a sensing device of the motor vehicle.

9. The method of claim 8, wherein the current weather parameter value comprises a temperature.

10. The method of claim 1, further comprising:
    determining the vehicle-dependent parameter value using the at least one weather parameter value received;
    sensing a current weather parameter value in a vicinity of the motor vehicle, which corresponds to one of the at least one weather parameter value;
    determining a difference between the current weather parameter value and the one of the at least one weather parameter value;
    comparing the difference to a predetermined threshold; and
    adapting the one of the at least one weather parameter value to the current weather parameter value if the difference exceeds the predetermined threshold.

11. A motor vehicle, comprising:
    a receiving device configured to receive extra-vehicle data, wherein the extra-vehicle data comprise at least one weather parameter value; and
    an evaluation device configured to:
       determine a vehicle-dependent parameter value, which depends on the extra-vehicle data; and
       determine a driving range for the motor vehicle, which depends on the vehicle-dependent parameter value, wherein
          the receiving device is configured to receive the extra-vehicle data from multiple additional motor vehicles, and
          the evaluation device is configured to verify the received extra-vehicle data using a confidence estimation before the vehicle-dependent parameter value is determined, wherein the confidence estimation takes into account a travel time for one of the multiple additional motor vehicles or for a minimum number of the multiple additional motor vehicles.

12. The motor vehicle of claim 11, further comprising a device configured to:
    determine an energy demand per route segment or per unit of time as the vehicle-dependent parameter value for the motor vehicle.

13. The motor vehicle of claim 12, wherein the evaluation device is further configured to calculate the energy demand per route segment or per unit of time for cooling or climate control of the motor vehicle.

14. The motor vehicle of claim 11, wherein the at least one weather parameter value comprises an ambient temperature.

15. The motor vehicle of claim 11, wherein the extra-vehicle data comprises at least one energy demand per unit of distance or per unit of time for the one of the multiple additional motor vehicles.

16. The motor vehicle of claim 11, wherein the receiving device is further configured to:
    receive the extra-vehicle data from a server device.

17. The motor vehicle of claim 11, further comprising a sensing device configured to:
    after the determining of the driving range for the motor vehicle, sense a current weather parameter value corresponding to one of the at least one weather parameter value in a vicinity of the motor vehicle, wherein the sensing device is further configured to:
        determine a difference between the current weather parameter value and the one of the at least one weather parameter value;
        compare the difference to a predetermined threshold; and
        adapt the one of the at least one weather parameter value to the current weather parameter value if the difference exceeds the predetermined threshold.

18. The motor vehicle of claim 17, wherein the sensing device comprises a temperature sensor to sense the current weather parameter value.

19. The motor vehicle of claim 17, wherein the current weather parameter value comprises a temperature.

* * * * *